UNITED STATES PATENT OFFICE.

HIRAM STAPLES, OF BATTLE CREEK, MICHIGAN.

COMPOSITION OF MATTER TO BE USED FOR PAVING AND ROOFING PURPOSES.

SPECIFICATION forming part of Letters Patent No. 344,210, dated June 22, 1886.

Application filed January 7, 1886. Serial No. 187,877. (No specimens.)

*To all whom it may concern:*

Be it known that I, HIRAM STAPLES, a citizen of the United States, residing at Battle Creek, in the county of Calhoun and State of Michigan, have invented a certain new and useful Composition of Matter to be Used for Paving and Roofing Purposes; and I do hereby declare the following to be a full, clear, and exact description of the invention, such as will enable others skilled in the art to which it appertains to make and use the same.

My composition consists of the following ingredients, combined in the proportions stated: Twenty-one cubic feet of gravel, crushed rock, or shells; seven cubic feet of "loess" or diluvial drift, and forty-two gallons of crude coal-tar or asphaltum. The loess and gravel should first be mixed. The coal-tar or asphaltum is then added to form a gummy mass of a consistency to be conveniently worked and spread upon the surface desired. The order, however, in which the ingredients are mixed is immaterial, the important thing being that they are thoroughly incorporated and mingled with each other.

The loess or diluvial drift which I use is found in the vicinity of Battle Creek, Michigan, and consists in a very fine yellowish-gray loam or calcareous clay. This material is also found in the Mississippi Valley in large quantities, as well as other places, and is a deposit of the last epoch of the drift period, and is usually composed of silica, alumina, peroxide of iron, potash, carbonate of lime, magnesia, and a small proportion of other matters. It varies in composition within small limits in different localities, but is always very fine, and combined with coal-tar makes a strong cement or matrix for the solid material constituting the body of the mixture. It readily absorbs the coal-tar or asphaltum, and while it permits the evaporation of the volatile elements thereof sufficient for the body to harden it does not disintegrate. In short, this simple and economical mixture makes a durable and impervious pavement or roofing composition.

The mixture with asphaltum is preferred for roadways and for paving-blocks where heavy work is required.

The pavement is finished by a fine coating of sand.

Having now described my invention, what I claim, and desire to secure by Letters Patent, is—

1. The roofing and paving composition herein described, consisting of the mixture of loess or diluvial drift, coal-tar, or equivalent, and gravel, substantially as described.

2. A paving or roofing compound consisting of the mixture of loess or diluvial drift, gravel, and coal-tar, in the proportions herein specified.

In testimony whereof I affix my signature in presence of two witnesses.

HIRAM STAPLES.

Witnesses:
HENRY H. HUBBARD,
N. E. HUBBARD.